United States Patent Office 3,114,641
Patented Dec. 17, 1963

3,114,641
CITRUS JUICE PRODUCT
George S. Sperti, Burlington, Ky., and Elton S. Cook, Cincinnati, Ohio, assignors to The Institutum Divi Thomae Foundation, Cincinnati, Ohio, a corporation of Ohio
No Drawing. Filed Mar. 25, 1957, Ser. No. 648,000
5 Claims. (Cl. 99—105)

The invention relates to the manufacture of extended citrus juices such as orange juice and intermediate products having enhanced commercial values. The invention will be described primarily in connection with orange juice, it being understood that it may be applied to other citrus juices.

It is known to make orange-flavored beverages through the use of flavoring materials such as the oil recovered from the skins of oranges, sugars, citric acid and similar ingredients. While beverages sufficiently palatable to attain commercial success can be made in this way, the beverages themselves have a highly artificial flavor and are not comparable to natural orange juice.

Natural orange juice, however, is relatively expensive as a beverage. If consumed in areas where oranges are not grown, the product must be shipped either in the form of whole oranges or in the form of juices. Obviously this entails considerable expense. While it is somewhat less expensive to ship bulk juice than whole oranges, the juice itself has a relatively short life and must be maintained under conditions of refrigeration. Considerable development work has been done in the field of producing orange juice concentrates designed to be diluted with water to the consistency of natural orange juice at the point of use. Serious problems are involved, inasmuch as many methods of forming concentrates involve significant degradation of flavor. Certain methods and apparatus have been developed for the production of full-flavored concentrates, as hereinafter set forth; but if the concentrates are to have any substantial life they must be maintained under refrigeration to avoid deterioration. Many orange juice concentrates are in fact sold and shipped in frozen condition.

Thus, although there is evidence of a strong preference on the part of the buying public for orange juice over other beverages which are normally consumed in a chilled condition, the factors noted above have made it generally impossible for the public to secure natural orange juice, or a beverage having the same taste characteristics, at a price comparable to the price of other chilled beverages.

Hitherto there has been no way in which natural orange juice could be extended by dilution with retention of full and natural flavor characteristics. If natural orange juice is merely diluted with water it becomes, as might be expected, thin, relatively pale, and relatively insipid in flavor. It is possible to dilute an orange juice with water and then build back its sugar-acid ratio to the equivalent of whole juice, as by the addition of citric acid and sugar; but a beverage produced in this fashion suffers from the fact that its flavor is still either insipid or artificial or both. Nor are attempts effective to build back the flavor with natural or synthetic flavoring materials, since the net result is an increasingly artificial taste.

One of the objects of this invention is the provision of an extended juice which is similar in all respects, including flavor, to natural, whole juice.

Another object of the invention is the provision of products which are capable of great extension by dilution, but at the same time avoid the difficulties outlined above.

Yet another object of the invention is the provision of concentrates involving the ingredients of natural juice and capable of the aforesaid great extension, which products have a long life and excellent keeping qualities, and in particular do not require refrigeration.

Other objects of the invention have to do with methods for obtaining the products and results outlined above.

These and other objects of the invention which will be set forth hereinafter or will be apparent to one skilled in the art upon reading these specifications, are accomplished in those products and by those procedures of which certain exemplary embodiments will later be described.

The present invention is based upon the discovery (a) that while the quantity of flavor-imparting materials (esters, or essential oils) in natural orange juice is far above the level which can be appreciated by the taste buds or sensory system of a human being, so that dilution becomes possible, (b) the actual effect of the flavoring materials is dependent upon various factors not in themselves bound up with the essential oils or esters. Essential ones of these factors are salts, without which the esters in a diluted juice cannot produce a natural effect.

As a preliminary consideration, in a diluted product, the sugar-acid ratio and Brix value should be maintained, which can be done by appropriate additions of citric acid and sugar; but as set forth above this will not restore the flavor. The sugar-acid ratio in orange juice is generally between 11:1 and 17:1, while in grapefruit juice it is generally between 7:1 and 11:1. The maintenance of the sugar-acid ratio by appropriate additions of citric acid and sugar has been found to disturb the pH. This must be restored to an acceptable range, broadly 2.8 to 3.8. The pH of natural sweet orange juice, while variable, will usually be about 3.4 to 3.6, and this is a preferred range for the present invention.

The control of the pH is preferably accomplished by the use of relatively small quantities of organic or inorganic buffers. By way of example a relatively very small quantity of sodium citrate, in the presence of citric acid, will serve to raise the pH of a diluted product having a correct sugar-acid ratio, from an unduly low value say 2.5 to the entirely acceptable value of 3.5 and to maintain it there throughout the life of the product. Sodium succinate is an organic buffering agent having a similar effect. Sodium phosphate and potassium dihydrogen phosphate are other non-limiting examples of buffering agents.

But the flavor of the diluted orange juices has been found to depend on other materials. These, for the most part are salts, inclusive of such materials as calcium chloride, magnesium chloride, sodium or potassium citrates, tartaric and malic acids and their salts. These also are used in very small amounts. It will be noted from the inclusion of sodium and potassium citrates in the above examples that these salts are capable not only of acting in the presence of citric acids as buffering agents, but also are capable of acting as flavor-enhancing materials. The importance of these various additives is that in various combinations they affect the flavor of diluted orange juice in such a way as to avoid entirely the insipidizing effect of dilution per se, without in any way contributing foreign or artificial tastes and odors. They make it possible to extend whole orange or grapefruit juices very greatly while relying on their natural contents of characteristic essential oils which, as explained above, have been discovered to be far in excess in the natural product of the quantities required for full flavor. The dilutions contemplated may extend from 1:1 to as much as 1:4 with the production of products of completely natural taste and full flavor. Indeed, repeated tests with panels of blindfolded persons have demonstrated that it is not possible to distinguish the diluted products of this invention from undiluted natural fresh orange juices. Where the word "taste" is used herein the effect of the product on the olfactory nerves of the user is intended to be included.

When a natural juice is diluted it will ordinarily lose body to some extent. This can be corrected by the addition of small quantities of a bodying agent such for example as citrus pectin, agar, any of the non-toxic natural gums, karob flour, corn starch, carboxymethylcellulose or the like.

The consuming public expects orange juice to contain a certain amount of relatively fine pulp. In the machine-juicing of oranges considerable pulp is produced. This is normally separated from the orange juice prior to the irradiation of the juice with ultraviolet light. The separated pulp is usually graded into a coarse and a fine fraction; and after the irradiation some portion of the fine fraction is remixed with the juice. Any remaining portion of the pulp is normally discarded. Where the juice is to be diluted in accordance with this invention it may advantageously contain such an additional amount of pulp as will bring its pulp content to the normal or expected value when the dilution is accomplished. If this requires more than the fine pulp fraction, the coarse pulp fraction may be used with such comminution as may be desired. It should be noted that pulp itself gives the effect of a bodying agent, so that in many instances satisfactory products may be made without other bodying agents.

The coarse pulp fraction is usually lighter in color than the fine pulp fraction. Moreover, the dilution of natural orange juice will cause it to become paler, which is not ordinarily desired. The coloring of the extended juice by means of soluble, non-toxic coloring materials may be practiced, but is not ordinarily preferred because the essential coloring material in natural orange juice is not in the liquid portion itself but rather in the pulp capable of settling therefrom upon standnig. It has been found that an entirely natural effect may be obtained by coloring the pulp with an oil-soluble coloring material in a suitable vehicle which is driven off by evaporation. Thus the coarse and comparatively light colored pulp fraction when separated from the orange juice may be colored with a solution of carotene in benzene or other volatile organic solvent. The solution is mixed with the pulp, after which the solvent is driven off or evaporated under vacuum. The pulp may then be comminuted and added to the irradiated juice, and a product obtained which will have a natural and attractive color upon dilution. The vitamin value of the product is thereby enhanced, since carotene is pro-vitamin A.

It is desirable that the vitamin C content of the natural juice be increased when the juice is intended for dilution as herein set forth. This may be accomplished by the addition of suitable quantities of ascorbic acid. Another advantage of such an addition is that the ascorbic acid, being an effective anti-oxidant, tends to prevent deterioration of the essential oils and improves the keeping qualities of the product.

It will be clear that when treating natural orange juices, the various substances contemplated for addition in accordance with this invention may be added to the natural juice and the product shipped and stored prior to dilution. The quantities of substances so added to natural juices will be proportioned to the specific dilutions for which the product is intended. On the other hand, natural orange juice may first be diluted after which the various additives may be used in quantities proportioned to the actual dilution, all in accordance with the teachings hereof and the examples which follow. Yet again, the additives may first be placed in the water used for dilution.

The practice of this invention, however, is by no means restricted to the treatment of natural orange juices. As has been indicated, means and methods have been developed for the production of full flavored orange juice concentrates. The most satisfactory means and method are those set forth in Patent No. 2,588,338, dated March 11, 1952, to George S. Sperti, and in the copending application of Charles S. Walker, Serial No. 489,325, filed February 21, 1955, and entitled Continuous Process and Apparatus for Making Concentrated Liquids. While the specific mode of manufacture of concentrates to be used in the practice of this invention is not a limitation hereof, the concentrate should be full flavored, since if the concentration procedure involves any substantial loss or degradation of the flavoring ingredients, the product will obviously not be suitbale for dilution, or the degree of permissible dilution will be severely limited.

Where a concentrate is employed, the degree of concentration is not a limitation on the invention. However it is readily possible to make concentrates from which about 75% of the original water content has been removed, i.e. a 4:1 concentrate; and such a concentrate will be used as exemplary herein. It will be clear that when such a concentrate has been diluted with three parts of water the equivalent of whole natural orange juice will be obtained. In the practice of this invention, however, such a concentrate can be readily diluted in ratios of 1:12 or 1:16, based on the volume of the original concentrate.

In the light of the teachings herein, this permits the manufacture of concentrated products containing all of the additives for dilution, which products are adapted for very great dilutions. Hence, the cost of the ultimate product can be still further reduced and, in particular, to a point where it is definitely less than the normal cost of other beverages customarily consumed in the chilled condition.

Other advantages flow from the manufacture of concentrates carrying the additives for dilution. For example such concentrates can be made with so high a sugar content as to be above the level which permits fermentation. Thus the concentrates need not be shipped and stored under conditions of refrigeration. Normally these concentrates will be in the form of heavy syrupy liquids or even in more viscous forms resembling pastes or gelatinous masses especially where bodying agents have been employed. This facilitates dispensing, as with a spoon. Two of the organisms responsible for fermentation and spoilage of juices will not grow at any temperature if the sugar concentration is greater than 42 Brix. At temperatures below 50° F., they will not grow in sugar concentrations greater than 30 Brix. Yeasts can grow in sugar concentrations as high as 58 Brix if the temperature is 60° F. Lowering the temperature to 50° F. will prevent yeast growth at this high sugar concentration; but even at 40° F. there can be some growth at sugar concentrations as high as 42 Brix. However, the concentrates of this invention in irradiated condition and kept in a closed container do not require refrigeration.

The use of preservative agents in such concentrates is not a departure from the spirit of the invention. For example 1/10 of 1% of benzoate of soda may be added to a concentrate such as has been described, and will inhibit bacterial action even at high temperatures of handling and storage. It will further be apparent that when the product has been diluted as described the percentage content of the preservative will be exceedingly low. However, preservatives have not been found necessary under normal conditions, and 4:1 concentrates containing the additive for dilution, but without preservatives, have been kept in containers at room temperature over many months without showing any signs either of fermentation or of the development of molds or fungoid growth. Moreover, in such a concentrate, the relatively high concentration of ascorbic acid (where used) enables it to serve more efficiently as an anti-oxidant.

The addition of artificial flavoring, including oil extracted from orange peel, is not precluded if desired; but it is a great advantage of the present invention that the normal quantity of essential oils or esters present in the natural juice or any concentrate properly made therefrom is enough to provide full flavor at the dilutions taught herein so that no additional flavoring is required with an accompanying artificial or "medicinal" taste.

The final, diluted product will have the same or substantially the same sugar-acid ratio and pH as the natural whole juice. Even though ordinarily sugars are added in accordance with this invention, a conversion will occur in the product so that the diluted product will have no greater caloric content than the natural juice.

A formula for the practice of the invention in the best form known to the inventors follows:

| Ingredient: | Percent (weight per volume) |
|---|---|
| Sucrose | 11.50 |
| Citric acid | 0.85 |
| Calcium chloride | 0.04 |
| Sodium citrate | 0.06 |
| Potassium dihydrogen phosphate | 0.04 |
| Trace mixture | 0.01 |
| Ascorbic acid | 0.05 |
| Pulp | As needed |

The total quantity of additives depends upon the degree of extension desired. Thus the quantity of additives in the above table is given in percentage of weight per volume. If fresh juice were to be extended in a 1:4 ratio, for each gallon of fresh juice three gallons of extender would be required, the weight of which would be twenty-four pounds. The actual weights of additives can be readily calculated as the indicated percentages of the weight of any given volume of extender. Likewise, if a 4:1 concentrate were to be extended in a 1:16 ratio, for each gallon of the concentrate, three gallons of water would be required to restore it to natural condition plus twelve gallons of extender weighing 16 pounds; and the actual weights of additives can similarly be calculated.

The formula holds, also, in producing lesser dilutions, for the percentage weight of the additives will be the same despite variations in the actual volumes of extender employed.

Another formula, together with typical cost figures is:

Brix—10.3
Acid—.76
Ratio—13.6

BASIS FOR 500 GALLON BATCH

| Item | | Amount | Cost per Unit | Cost of Ingredient |
|---|---|---|---|---|
| California concentrate [1] | gal | 5 | $4.01 | $20.05 |
| Fresh orange juice [1] | gal | 32 | .60 | 19.20 |
| Sugar | lb | 375 | .0905 | 33.94 |
| Citric acid | lb | 27 | .302 | 8.15 |
| Sodium citrate | lb | 6.1 | .27 | 1.65 |
| Sodium phosphate (Mono-basic) | lb | 1.1 | 1.20 | 1.32 |
| Ascorbic acid | lb | .5 | 4.80 | 2.40 |
| Sodium chloride | lb | 2.1 | .01 | .02 |
| Carotene (Conc. 0.05%) | gal | .25 | 3.20 | .80 |
| Trace Mixture: | | | | |
| Sodium succinate | lb | .25 | 2.38 | .60 |
| Tartaric acid | lb | .55 | .48 | .26 |
| Potassium acetate | lb | .55 | .31 | .17 |
| Starch (corn) [2] | lb | 35 | .085 | 2.98 |
| Pulp (11%) | gal | 55 | .12 | 6.60 |
| | | | | 98.14 |

[1] 64 gallon of fresh orange juice may replace the concentrate-fresh orange juice mixture. This is an 8:1 stretch.
[2] The 35 lbs. of starch are to be suspended in 100 gallons of water, heated up with steam to 212° F. and diluted with cold water gradually to 150 to 200 gallons total.

Cost.—$98.14, 500 gallon batch; .1963 gal.; .0491 qt.
Cost per Quart.—Ingredients, .0491; Carton and case, .020; Labor, .0025.

As indicated above, the calculated amounts of additives may be dissolved in or mixed with the juice or concentrate to be extended, the water used to extend it, or the extended product. Mixing the additives with the original juice or concentrate makes possible the manufacture and shipment of a product designed for a particular degree of dilution with ordinary water, and in the case of concentrate, as set forth above, permits the manufacture and shipment of a syrupy or viscous product containing a minimum of water and having keeping qualities in the absence of refrigeration.

Where a product is made to have substantially the above-noted percentages by weight of additives in each volume of extender employed, the resultant extended juice will have a Brix value of about 11.5, a sugar to acid ratio of about 13.5:1 and a pH of about 3.5, all of which is highly desirable.

The above values may be varied within reasonable limits. The sugar:acid ratio may be altered, but should be kept within the range first set forth herein. Bodying agents may be omitted, if desired, or other bodying agents may be substituted, such as karob flour or corn starch.

The "trace mixture" in the first formula is an equimolecular mixture of magnesium chloride, sodium succinate, sodium tartrate and malic acid. While these substances may be added individually in appropriate amounts, the total quantities of them are relatively so small that it is more convenient to handle them as a preformed mixture.

The ascorbic acid is normally desirable but can be omitted in instances where it is not thought necessary to maintain the vitamin C content.

The practice of the invention permits the provision of greatly extended citrus juices which are indistinguishable in flavor from whole natural juices but which may be produced at very low costs, comparable to or less than the cost of popular beverages normally consumed in the chilled condition.

The preferred products of the invention do not employ artificial flavoring materials. While the invention has been described in connection with orange juice as an exemplary embodiment, the teachings hereof apply also to beverages made from other citrus juices.

Modifications may be made in the invention without departing from the spirit thereof. The invention having been described in the aforesaid exemplary embodiment, what is claimed as new and desired to be secured by Letters Patent is:

1. An orange juice product intended for dilution comprising the ingredients of natural orange juice plus additives based in quantity on the degree of intended dilution beyond the water content of natural juice, the said additives comprising (a) sugar and citric acid in quantity to maintain the sugar-acid ratio of the extended product substantially in the range of 11–17:1, (b) a buffering agent in quantity sufficient to maintain the pH of the extended product substantially in the range of 3.4 to 3.6, and (c) a small quantity of a trace mixture consisting of in admixture, sodium succinate, tartaric acid and potassium acetate.

2. The product of claim 1 produced on a base of full flavored orange juice concentrate.

3. An orange juice product designed for extension by the addition of water as an extender, the said product containing orange juice plus a percentage weight based on each volume of extender of additives as follows: sucrose, substantially 11.50%; citric acid, substantially 0.85%; calcium chloride, substantially 0.06%; sodium citrate, substantially 0.06%.

4. The product of claim 3 containing also minor quantities of ascorbic acid, magnesium chloride, sodium succinate, sodium tartrate, malic acid, a bodying agent and orange pulp.

5. An orange juice product intended for dilution comprising the ingredients of natural juice plus additives based in quantity on the degree of intended dilution beyond the water content of natural juice, the said additives comprising (a) sugar and citric acid in quantity to maintain the sugar-acid ratio of the extended product substantially in the range of 11 to 17, (b) a buffering agent in quantity sufficient to maintain the pH of the extended product substantially in the range of 3.4 to 3.6 and (c) less than 1% on a weight basis per volume of intended dilution of an equimolecular mixture of magnesium chloride, sodium succinate, sodium tartrate and malic acid.

References Cited in the file of this patent
UNITED STATES PATENTS

| | | |
|---|---|---|
| 1,955,864 | Stevens | Apr. 24, 1934 |
| 2,647,058 | Schapiro | July 28, 1953 |